Oct. 20, 1953   T. J. FIORUCCI   2,656,427
AUTOMOBILE DOOR SWITCH DEACTIVATOR
Filed Dec. 24, 1951
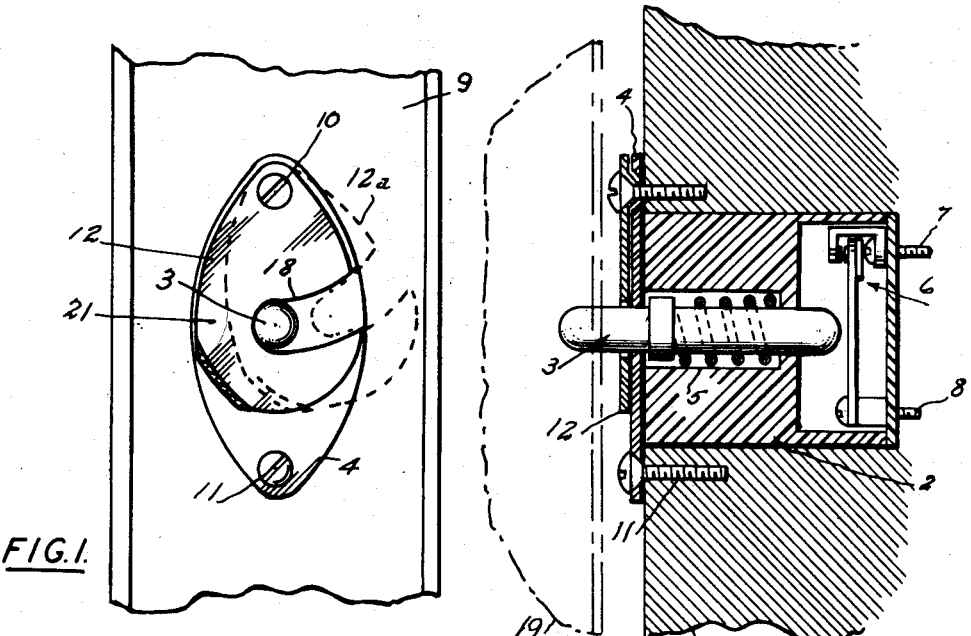
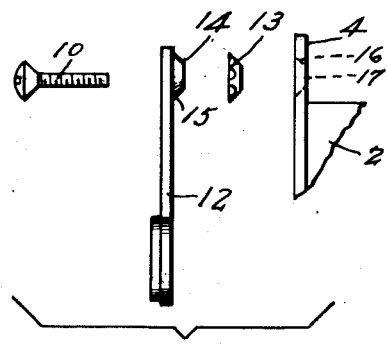
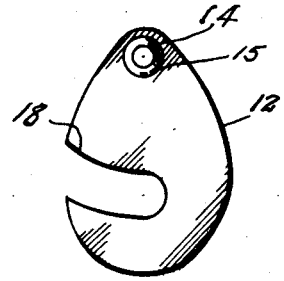
FIG.1.
FIG. 2.
FIG.3.
FIG. 4.
INVENTOR.
Thomas J. Fiorucci
BY
Scott L. Nowiel
ATTORNEY Patented Oct. 20, 1953

2,656,427

UNITED STATES PATENT OFFICE 2,656,427

AUTOMOBILE DOOR SWITCH DEACTIVATOR

Thomas J. Fiorucci, Phoenix, Ariz.

Application December 24, 1951, Serial No. 263,070

3 Claims. (Cl. 200—61.82)

This device concerns an automobile door switch deactivator.

Many automobiles are provided with switches set in the door frames which are arranged to close the electrical circuits in which they are included and turn on dome lights, or other lights, whenever one or more doors are opened. It is not always desirable to have these lights go on whenever the doors are open, and since the manufacturers have provided no disconnecting switch it is desirable that mechanical deactivating means be provided.

Accordingly, one of the objects of my invention is to provide a mechanical disconnecting mechanism which can be easily attached to a switch of the type mentioned and will fit between the door and the door frame and will prevent action of the switch when in one position and will permit the switch to normally operate when in a second position;

Another object is to provide a plate which may be pivotally attached to an automobile door switch so that it may be swung from a position where it renders the switch operating button inoperative, to a position where it will not interfere with the normal operation of the switch; said plate and the component parts attaching it to said door switch being constructed in a manner so as not to interfere with the action of the door;

Still another object is to provide a device as above described which includes a pivoted plate having means for pivoted support on an automobile door switch box and a thumb tab to aid in moving the plate on its support;

Other objects will appear hereinafter.

I attain the foregoing objects by means of the devices illustrated in the accompanying drawings, in which Figure 1 is a front elevation of my automobile door switch deactivator in position on an automobile door switch;

Figure 2 is a side elevation thereof, with the automobile door shown in dotted outline;

Figure 3 is a side elevation of the deactivator plate with the attaching screw, spring washer, and a portion of the switch plate, shown in expanded relation; and, Figure 4 is a back view of said plate.

Similar numerals refer to similar parts in the several views.

In the drawings 2 indicates a switch box in which the plunger 3 operates, sliding outward and inward from the attaching face plate 4. A spring 5 normally holds plunger 3 outward. In this position switch 6 in the rear portion of box 2 closes a circuit which includes the lead wire attaching terminals 7 and 8. Terminal 7 is connected to a dome light in the automobile driving compartment (not shown) and terminal 8 is connected to a terminal of the automobile battery (not shown). The switch box 2 is set into the automobile door frame 9 and normally attached by two screws 10 and 11.

My deactivating plate 12 is shaped in plan somewhat the same as the face plate 4. It is perforated at the top at 14 to receive top attaching screw 10 and the area surrounding the perforation is dimpled at 15 to fit into the countersink 16 surrounding the hole 17 through which screw 10 enters face plate 4. Between the inner face of dimple 15 and the face plate 4 there is a sun friction washer 13, as indicated in the expanded view, Figure 3.

When plate 12 is attached to plate 4 by screw 10 it normally is placed or swung to the position shown by solid lines, Figure 1. In this position switch plunger 3 protrudes through notch 18 in and switch 6 operates in a normal manner, closing each time door 19 is opened. When, however, plate 12 is swung to the right so that it occupies the position shown by dotted outline 12a the left hand portion 21 of the plate covers the plunger 3 and keeps it in a depressed position so that switch 6 remains open.

In use after the automobile door is opened it is only necessary to place the finger on the protruding end of the plunger 3, push it into switch box 2, and then engage the upturned knurled tab 20 with the thumb and swing the plate 12 to the right as indicated at 12a. The plate is then held, not only by the friction of sun washer 13, but by the friction of the end of plunger 3 against the back of plate 12. Reversing this operation will return the plate to the left and the switch will again operate in a normal manner.

From the foregoing it will be seen that I have provided a simple, cheap, and efficient switch accessory which will enable automobile users to render the automobile door switches inoperative when desired, without the use of a second switch and without altering the basic structure of the switch or switch box.

I claim:

1. In an automobile door switch having a body inserted through an automobile door frame and an attaching plate securing it to said door frame, and having a plunger, normally held outward from said body by a spring, to open switch contacts included in an electrical lighting circuit within the car when pushed inward by the closing of the car door and close the said switch when the car door is opened, the combination therewith of a switch deactivating plate operating between said door frame and the edge of the door therein having an attaching hole pierced through its upper portion, a slot extending inward from one lateral edge to approximately its center and an upturned thumb tab formed adjacent the bottom of the opposite lateral edge to enable the user to swing said plate; a screw, forming a pivot support, extending through the attaching hole in the deactivating plate and threaded into the attaching plate of said switch body, arranged so that said deactivating plate is pivotally supported in front of the face of said switch body plate with the notch in said deactivating plate disposed to receive said switch plunger when said deactivating plate is in normal downwardly depending position, whereby said door switch will operate normally; the lateral portion of said deactivating plate opposite said notch being disposed to hold said switch plunger inward to maintain said switch open when swung from the normal depending position to a tilted position with said lateral portion in register with said plunger.

2. In an automobile door switch having a body inserted through an automobile door frame and an attaching plate securing it to said door frame, provided with a screw-hole and countersink therearound, and a plunger normally held outward from said body by spring tension, arranged to close an electrical circuit when said plunger is extended outward and to open said circuit when said plunger is forced inward by the closing of the door within said door frame, the combination therewith of a deactivating plate, operating between said door frame and the edge of the door therein, having an attaching hole in its upper portion a dimple formed therearound on its inner face, adjacent said attaching plate to enter and make frictional contact with said counter sink, a notch extending from one lateral edge to approximately the center of said plate, a lateral portion adjacent the inner end of said notch disposed to contact the outer end of said switch plunger, and an upturned thumb tab to aid in swinging said plate formed along the bottom of said opposite edge; a sun spring washer positioned between said dimple and said countersink to maintain frictional engagement between said deactivating plate and said attaching plate; a screw pivot extending through the said attaching hole in said disconnecting plate, through said sun spring washer, and into said switch attaching plate; said deactivating plate being disposed on said attaching plate to swing from a normal depending position with said switch plunger extending through said notch therein, to a tilted position with said lateral portion adjacent said notch in register with said plunger to hold it in depressed position and maintain said switch open.

3. In an automobile door switch attached to an automobile door frame and having a spring operated plunger operating switch contacts so that said switch is closed whenever the automobile door is opened, the combination therewith of a switch deactivating plate having a hole in its upper portion to receive an attaching screw, a notch extending inward from one lateral edge to admit the spring operated plunger of said switch, a lateral portion extending beyond said notch disposed to contact the end of said plunger, and an upturned thumb tab to enable the user to swing said plate; a screw extending through said hole in said deactivating plate and into said switch so that said deactivating plate is pivotally supported between said door frame and the edge of the door therein; said plate being arranged to hold the plunger of said switch inward thereby holding said switch open when said plate is swung laterally on its pivotal support to a tilted position where said lateral portion extending beyond said notch is in register with the end of said plunger, and to permit said plunger to extend outward through said notch when swung to a normal vertical position.

THOMAS J. FIORUCCI.

References Cited in the file of this patent
UNITED STATES PATENTS

| Number | Name | Date |
|---|---|---|
| 2,150,873 | Schultz | Mar. 14, 1939 |